June 10, 1930.　　　C. H. BOYULS　　　1,763,597
IRONING MACHINE
Filed July 12, 1928　　　11 Sheets-Sheet 1
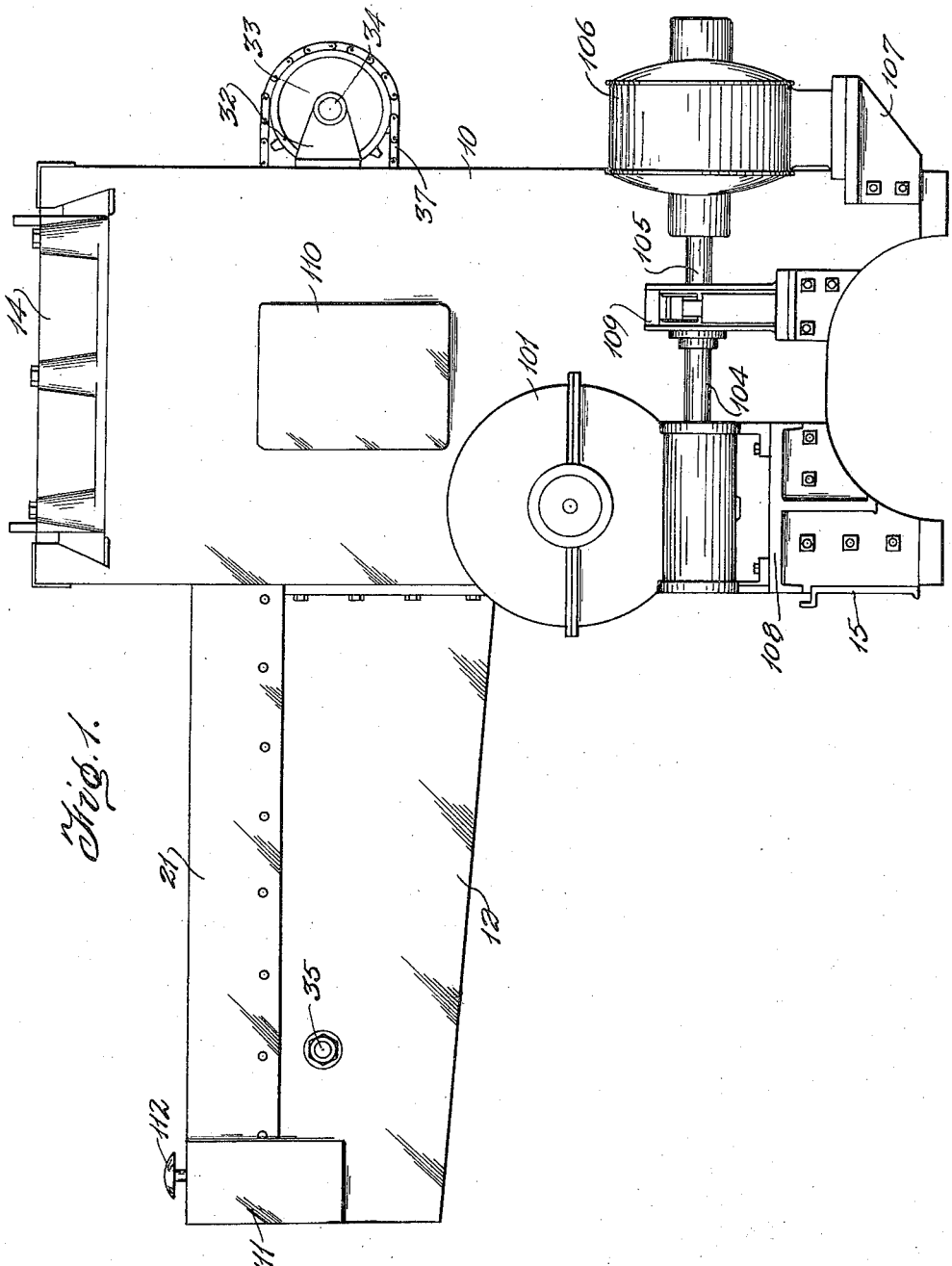
Fig. 1.
INVENTOR.
Cecil H. Boyuls,
BY 
ATTORNEYS.

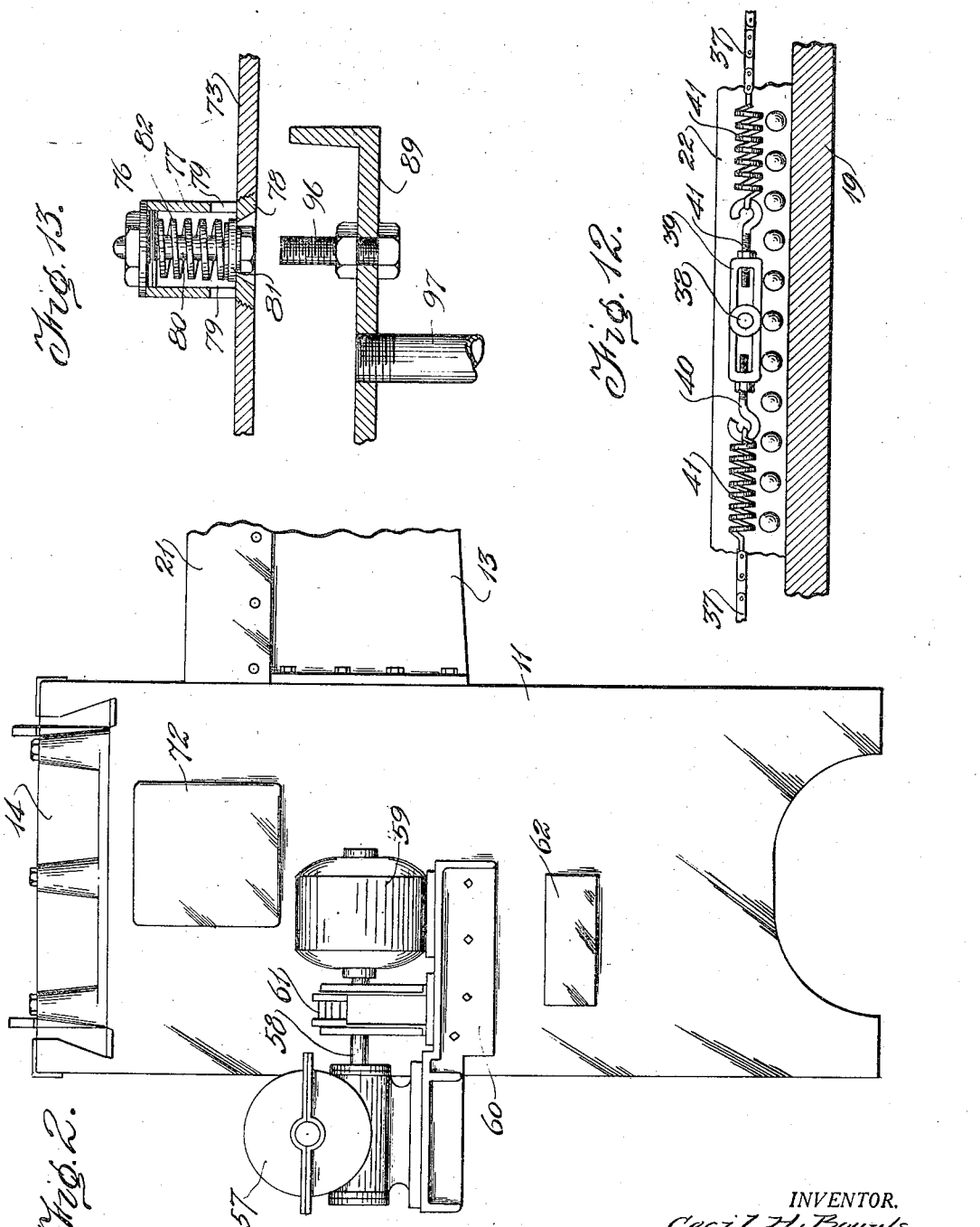

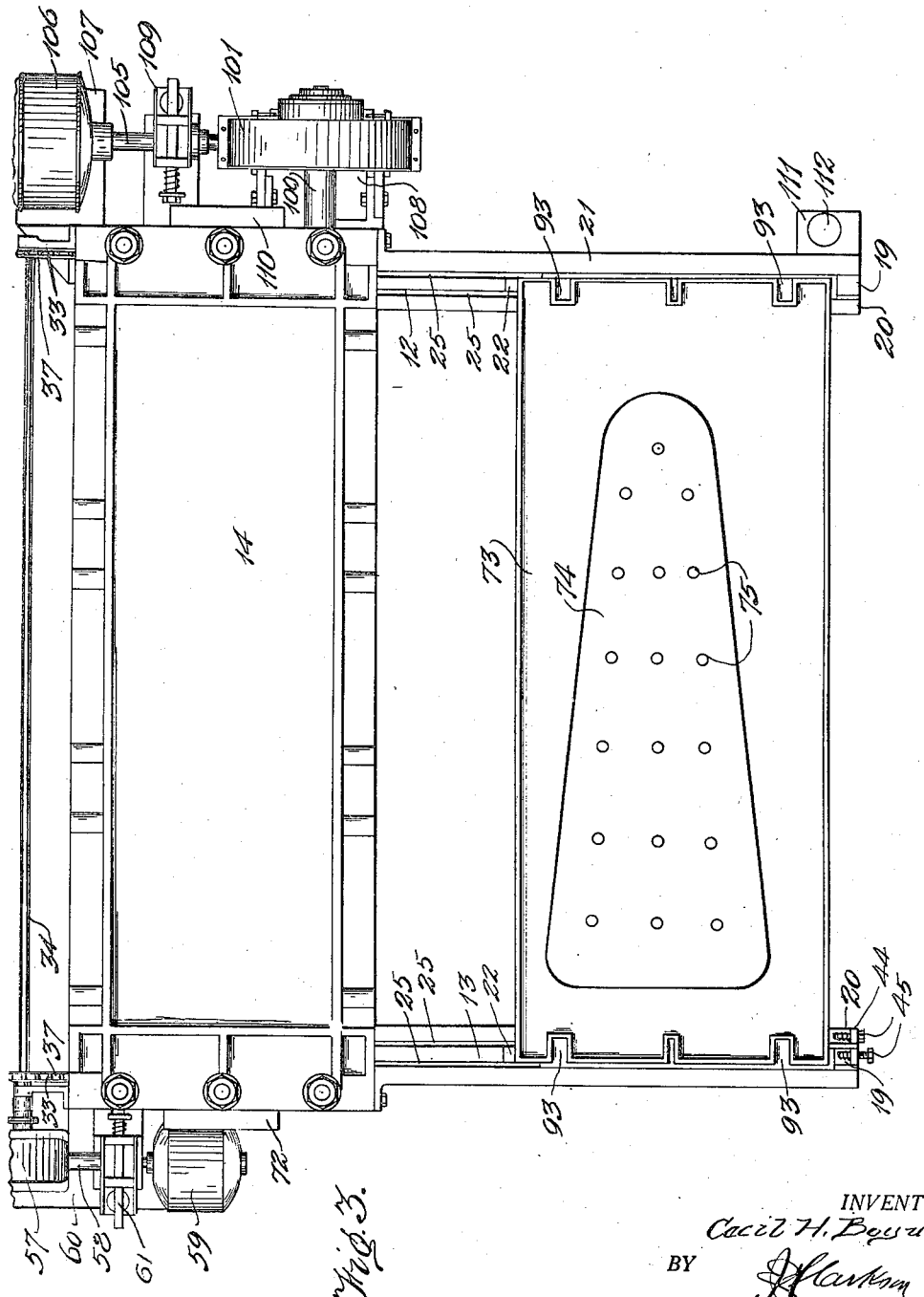

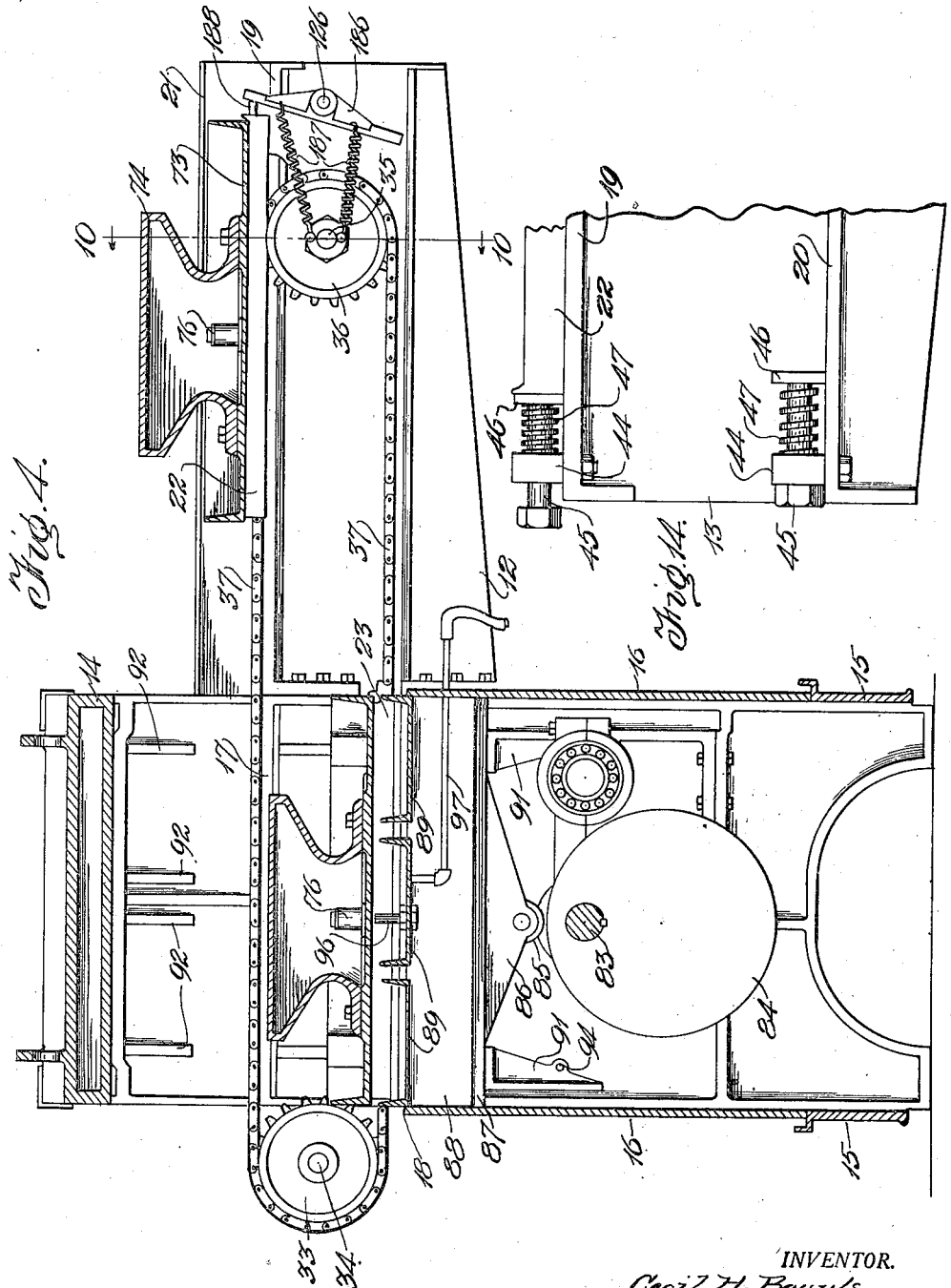

June 10, 1930.  C. H. BOYULS  1,763,597
IRONING MACHINE
Filed July 12, 1928  11 Sheets-Sheet 5
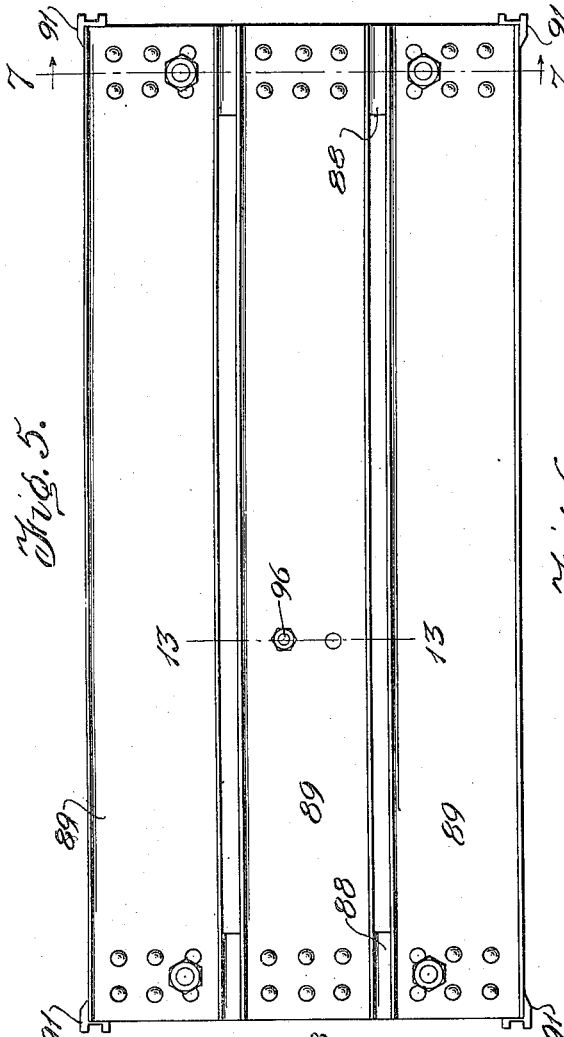
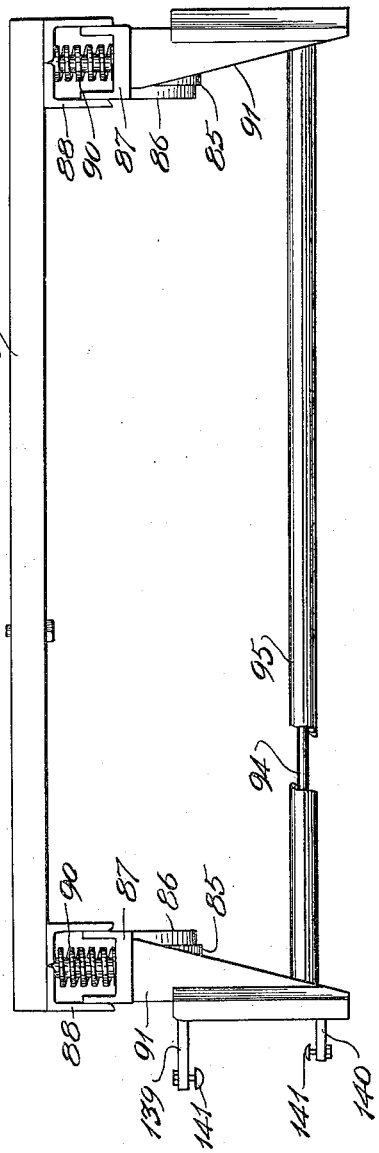
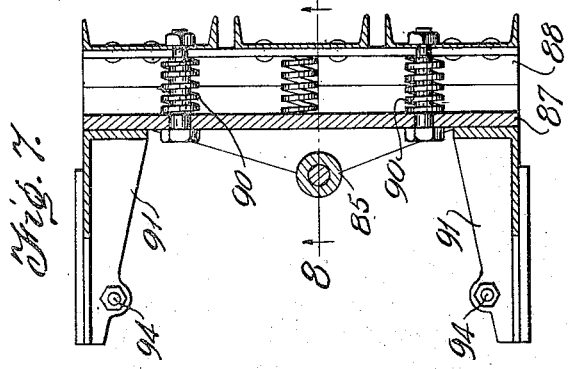
INVENTOR.
Cecil H. Boyuls,
BY
ATTORNEYS.

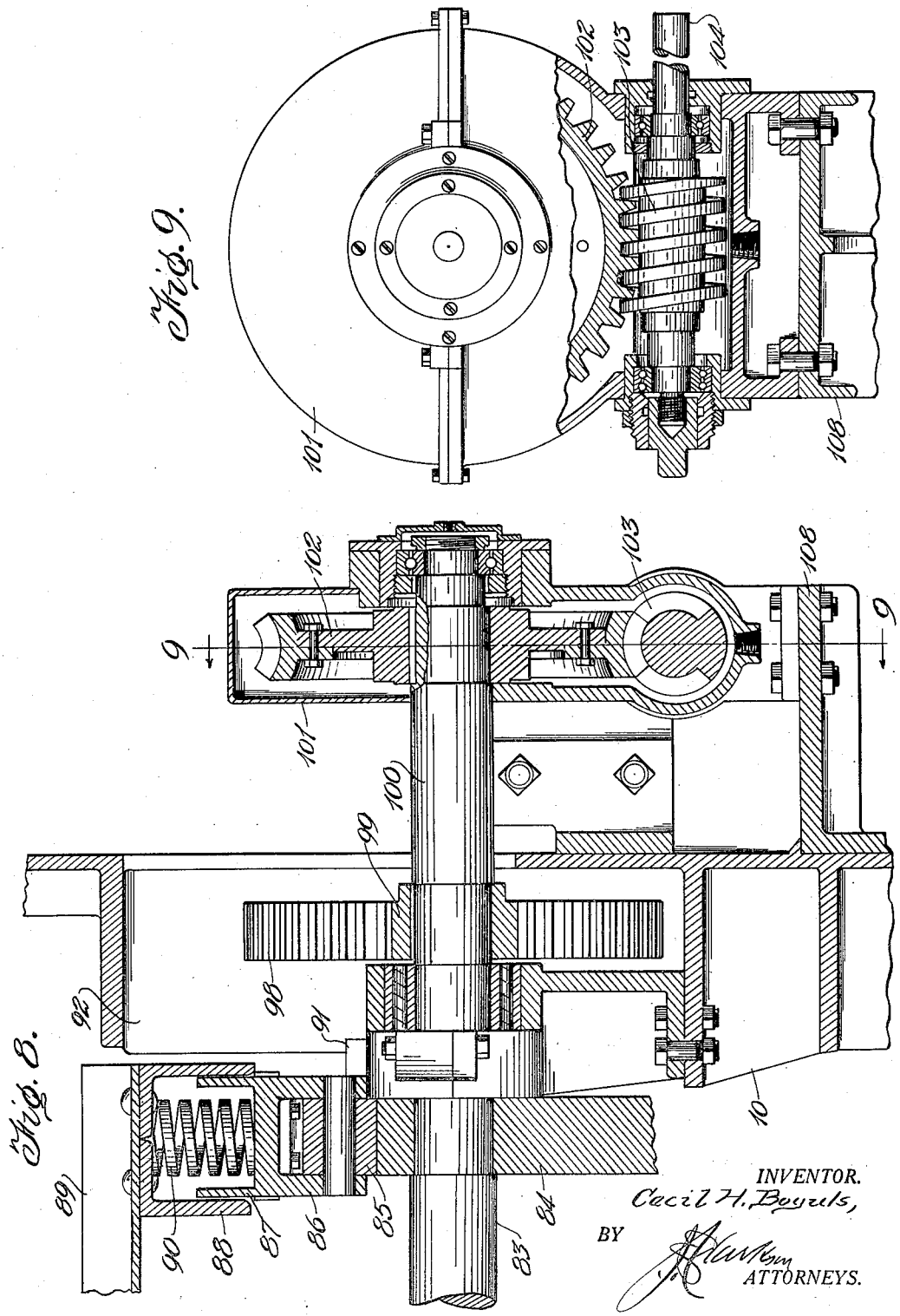

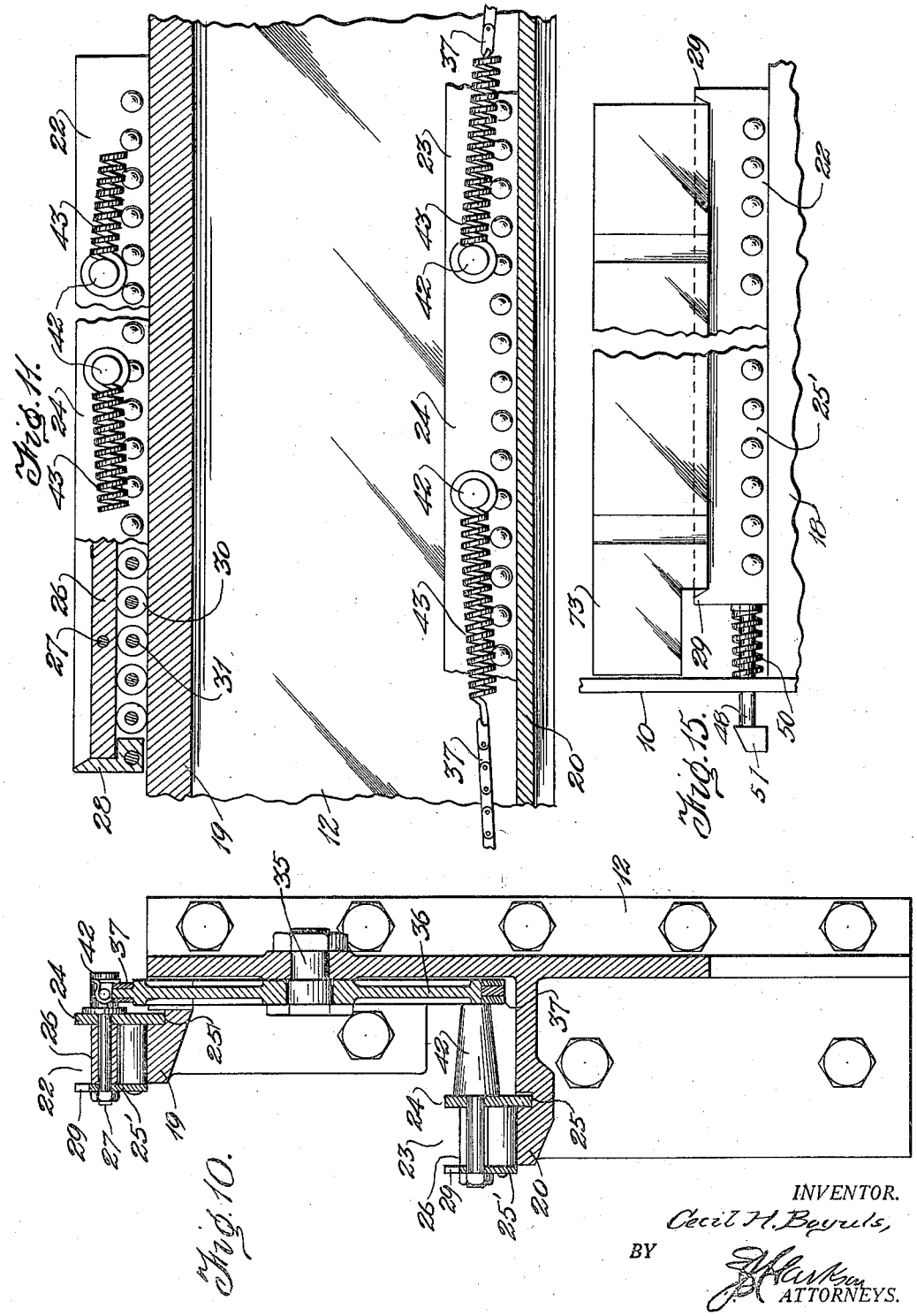

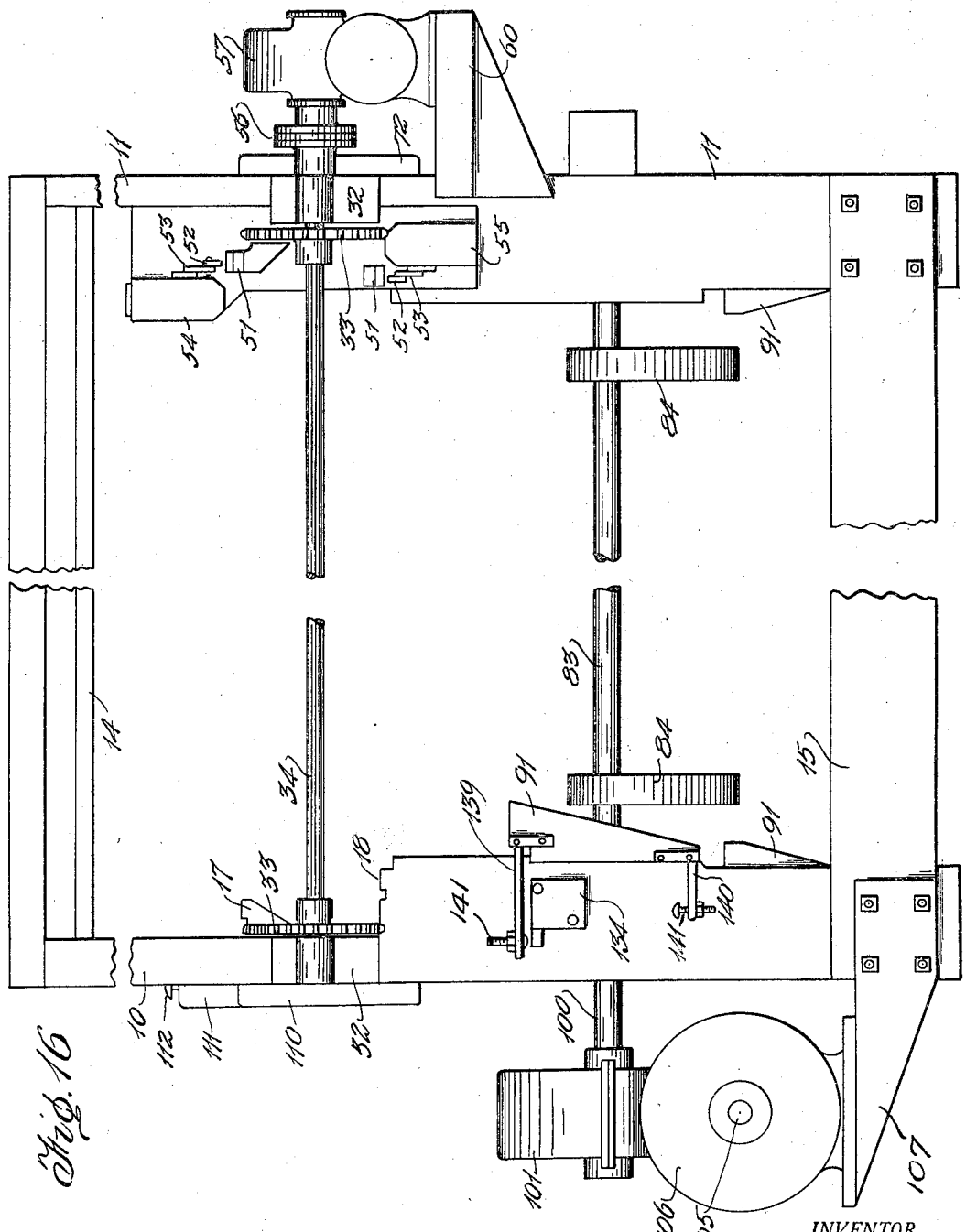

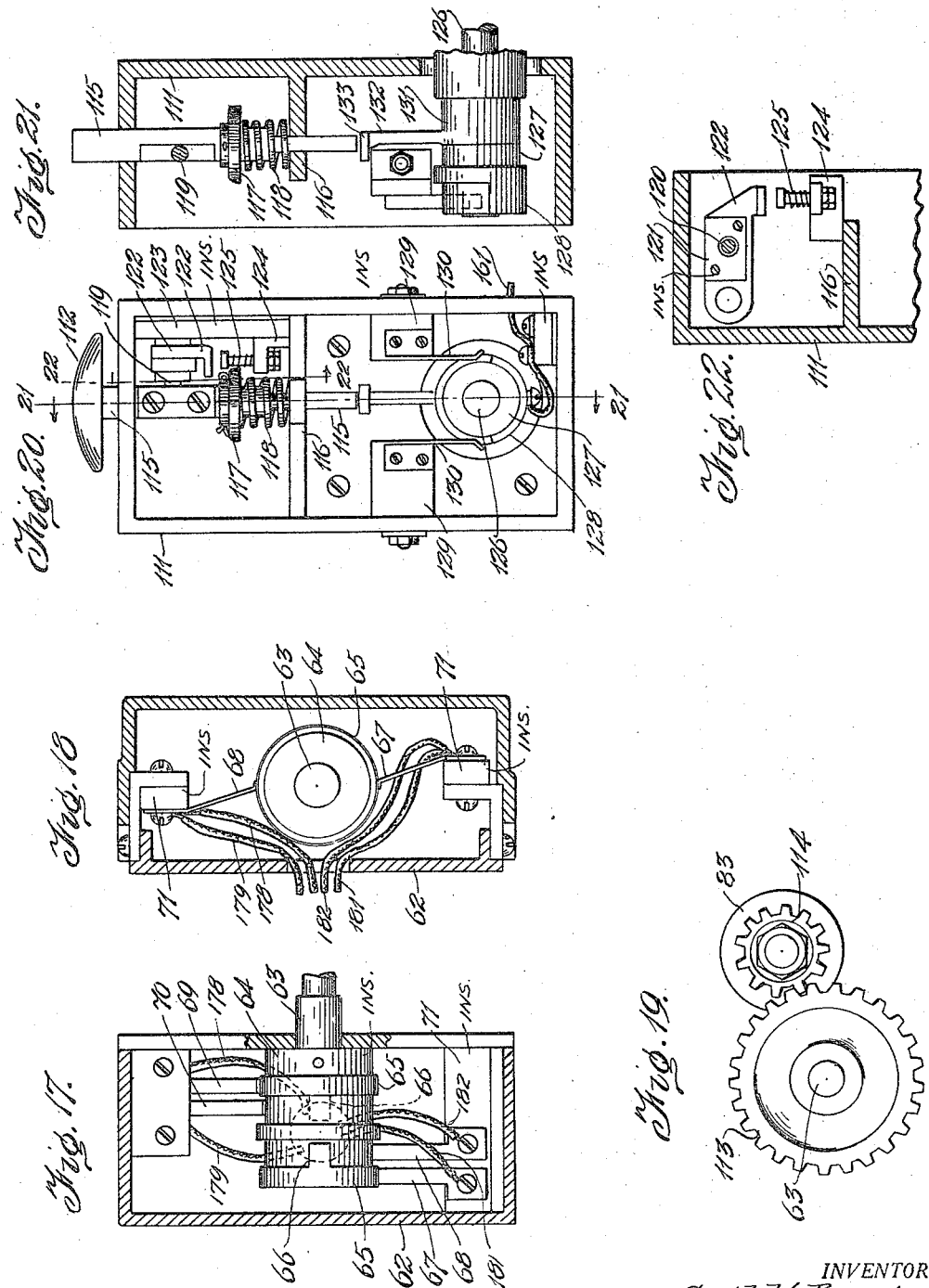

June 10, 1930. C. H. BOYULS 1,763,597
IRONING MACHINE
Filed July 12, 1928 11 Sheets-Sheet 10

INVENTOR.
Cecil H. Boyuls,
BY
*Clarkson*
ATTORNEYS.

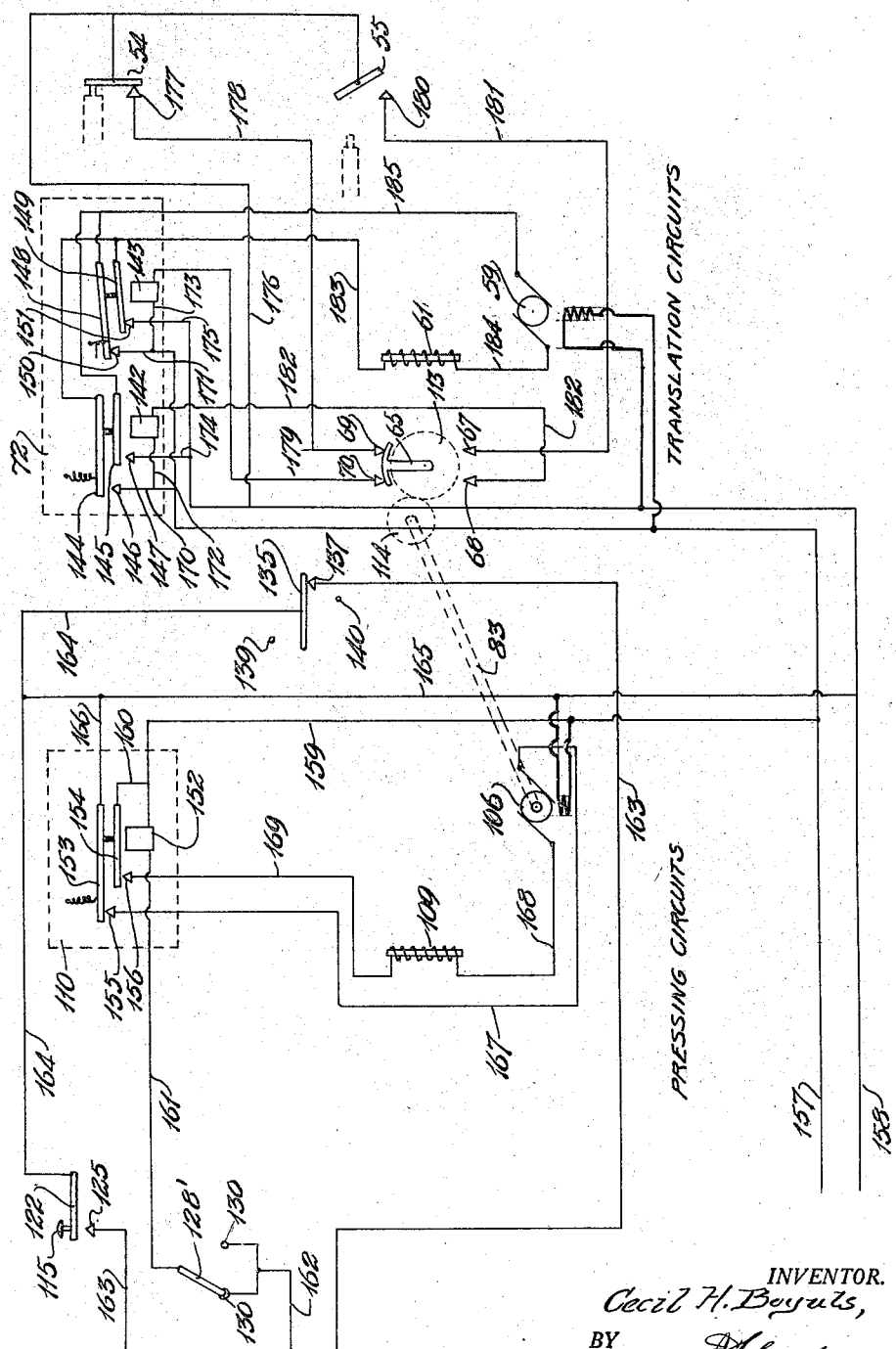

Patented June 10, 1930

1,763,597

UNITED STATES PATENT OFFICE

CECIL H. BOYULS, OF LOUISVILLE, KENTUCKY

IRONING MACHINE

Application filed July 12, 1928. Serial No. 292,232.

This invention relates to ironing machines and has special reference to that type of ironing machine in which the material to be ironed is pressed between a platen and buck, one of the two being suitably heated as by steam. More particularly the invention relates to an automatically operated ironing machine of this type.

Heretofore ironing machines have been devised in which there were provided a platen and a pair of bucks, the latter being shifted into position alternately for cooperation with the platen and then being forced into engagement with such platen. Such machines have commonly been manually operated both in the changing of the positions of the bucks and their movements toward the platen or the movement of the platen toward and from the positioned buck.

In the present machine both of these movements, which may be termed respectively the movement of translation and the pressing movement, are accomplished by electro-motive mechanism and one important object of the invention is to provide a novel general construction of such machines entirely driven by electro-motive mechanism and in which the entire cycle of operations is controlled from a single switch, thus doing away with all levers, treadles and the like and rendering the device, in its movements, completely automatic.

A second important object of the invention is to provide the electro-motive means with such circuit and switch arrangements that the movement of translation will be automatically followed by a pressing movement and that translation movement will be prevented during the period in which the pressing movement is taking place.

A third important object of the invention is to provide separate electro-motive devices for the movements of translation and pressing and to provide such circuit arrangements in connection with the electro-motive devices that whenever one of these devices is in operation the other will be automatically prevented from operating.

A fourth important object of the invention is to provide separate motive means for effecting the movements of translation and pressing and circuit arrangements including switches so arranged that when a movement of translation has been effected the motive means controlling that movement will be automatically cut out and the motive means for the pressing movement will be automatically thrown into circuit and maintained in circuit until the completion of the pressing movement and restoration of the parts to the position at the beginning of such pressing movement.

In devices of this kind it has heretofore been known that the alternate positioning of the bucks beneath the platen could be effected by means of an endless chain arrangement attached directly to the bucks. Such an arrangement entailed the objectionable feature that the chain arrangement was necessarily such as to permit slacking off of the chains during the lifting of the buck toward the platen. This made necessary the use of take-up means such as weights or springs.

A fifth important object of the present invention is to provide, in a device of this description, an endless chain arrangement for alternately positioning the bucks but having the bucks engageable with and disengageable from the endless chain arrangement during the lowering and lifting from and toward the platen.

A sixth important object of the invention is to provide, in a machine of this character, an endless chain arrangement for effecting the movement of translation of the bucks, this arrangement including carriers fixedly positioned relative to the chains and bucks resting on the carriers and so arranged that they can be lifted off of the carriers to move them toward the buck and lowered on the carriers after the pressing is completed.

Devices of this sort are usually provided with a hollow buck and trouble has been experienced in the collection of moisture and water from the clothing in the buck.

A seventh important object of the invention is to provide novel means whereby the buck may be drained during the lifting operation, it having a valve controlling the drain which remains closed during the movement of translation so that no water is spilled or thrown around on the machinery or floor adjacent the device.

An eighth important object of the invention is to provide a novel arrangement for connecting the carriers to the chain so that these carriers can be accurately positioned for the operation of the lifting and valve opening mechanisms.

A ninth important object of the invention is to provide improved and novel means for taking up the difference in thickness of the articles being pressed, the means operating toward the end of the lifting operation.

With the above and other objects in view as will be hereinafter apparent, the invention consists in general of certain novel details of construction and combination of parts hereinafter fully described, illustrated in the accompanying drawings and specifically claimed.

In the accompanying drawings like characters of reference indicate like parts in the several views, and:

Figure 1 is a side elevation of the complete machine showing the right side thereof.

Figure 2 is a partial side elevation of the machine showing the left side thereof.

Figure 3 is a plan view of the machine, certain parts of the driving mechanism being broken away.

Figure 4 is a vertical longitudinal section through the machine looking toward the right side thereof and taken about on the central plane of the machine.

Figure 5 is an enlarged detail view showing the buck lifting table removed from the balance of the machine.

Figure 6 is a front view of the parts shown in Figure 5.

Figure 7 is a section on the line 7—7 of Figure 5.

Figure 8 is an enlarged detail view on the line 8—8 of Figure 7 and showing the reducing and driving gear for the buck lifting table.

Figure 9 is a detail view partly in elevation and partly in section on the line 9—9 of Figure 8.

Figure 10 is an enlarged detail view through one of the side arms on the line 10—10 of Figure 4, the buck being removed and the parts behind the plane on which the section is taken being largely omitted.

Figure 11 is a view partly in section and partly in elevation of the upper part of Figure 10 showing one means of attaching the chains to the carriers.

Figure 12 is a detail showing a modification of the means of attaching the chains.

Figure 13 is an enlarged detail section taken partly on the line 13—13 of Figure 5 and partly through the buck drain valve.

Figure 14 is a detail view from the inside of the left hand arm showing the spring stops.

Figure 15 is a detail view showing the action of the carrier in operating the circuit breaking cam and the relation of the buck table thereto.

Figure 16 is a rear view in a somewhat diagrammatic manner showing the relationship of the various switches and certain other parts, many of the parts being omitted in order to bring out the remainder more clearly.

Figure 17 is a plan view of a motor reversing switch used herewith, the casing being shown partly in section.

Figure 18 is a view from the left hand side of Figure 17 with the casing in section.

Figure 19 is a view of the reducing gearing used to drive this switch.

Figure 20 is a front view, with the cover removed, of the starting and safety switch used herewith.

Figure 21 is a section on the line 21—21 of Figure 20.

Figure 22 is a section of the upper part of this switch on the line 22—22 of Figure 20.

Figure 23 is a detail view showing the guide shoe for vertical movement and the limit switch operated thereby, the view being a front elevation.

Figure 24 is a rear elevation of a portion of the left hand housing showing the arrangements connected with the limit switches or circuit breakers.

Figure 25 is a view taken from the right hand side of Figure 24.

Figure 26 is a diagrammatic view showing the wiring connections for this device.

In carrying out the present construction of the invention there is provided a pair of housings or main frame members, the right hand member being indicated at 10 and the left hand member at 11. The right and left hand arms 12 and 13 respectively extend out from these housings and are bolted securely to the forward edges thereof. These housings are connected at the top by a platen 14 in the form of a hollow steam chest which is provided with steam by any suitable arrangement of piping not deemed necessary here to be shown. Similarly, at the bottom the housings are connected by tie plates or bars 15 and the front and rear of the lower part of the housings may be closed by cover plates 16 best seen in Figure 4. Near the top of each housing is a trackway 17 and spaced below this trackway is a second trackway 18. These trackways are continued out at 19 and 20 respectively on the arms and these trackways are partly covered as by an arm cover or guard plate 21. Rolling along these trackways is a pair of carriers, the upper carrier being indicated at 22 and the lower carrier at 23, there being, of course, one pair of carriers on each side of the machine. Referring now to Figures 10 and 11 especially it will be seen that each of these carriers consists of an inner plate 24 the lower edge of which runs in a guide groove 25 formed in the respective trackway and that this inner plate is held in spaced relation to an outer plate 25' running at the edge of the trackway, by means of a spacing bar 26, which is held between the plates by suitable bolts 27. At each end there is a beveled topped end member 28 and the plate 25' is cut away at 29 to correspond with this bevel. Beneath the spacer 26 are arranged a series of rollers 30 held on shafts 31 so that these carriers readily roll along the trackways. Projecting rearwardly from each of the housings intermediate in height to the trackways is a bracket 32 and through these brackets extends a shaft 34 whereon are mounted the sprockets 33. Adjacent the forward end of each arm is a stub shaft 35 and on this stub shaft close to the inside of the respective arm is mounted a sprocket 36 of the same diameter as the sprockets 34. Now from an inspection of Figures 4 and 10 it will be seen that these sprockets are so positioned that the chains 37 which run on the sprockets lie close above the respective trackways. From each of the carriers extends means by which the carrier may be connected to the chains. In Figure 12 this means is shown as consisting of a single pin 38 whereon is fitted the central boss of a turn buckle strap 39 having turn buckle hooks 40 extending into its ends and connected by springs 41 with the chains 37. By this arrangement, the screws of the turn buckle and hooks both being of like hand, the position of the carrier 24 may be shifted slightly with respect to the chains so that each of these carriers may be accurately positioned for its work. A somewhat different form is shown in Figure 11 wherein each carrier has two pins 42 to which are directly connected the springs 43 which lead to the chains 37. However, it is preferred to use the first means on account of the adjustability thereof. On the front end of the arm 13 on each trackway thereof is mounted a block 44 through which slides a bolt 45 having a head on its front end and carrying on its rear end a plate 46 which is engageable by the front end of the carrier on reaching its forward movement. Springs 47 normally urge these blocks rearwardly. By this means the shock of the carrier in moving to the front is taken up gradually.

Similarly, on the rear of the left hand housing 11 just above each trackway is arranged a sliding bolt 48 having on its forward end a head 49 which is urged forwardly by a bolt 50. These bolts take up the shock of the carriers moving rearwardly and at the same time each of these bolts has on its rear end a bevel ended head 51 which engages the roller 52 of the operating arm 53 of a limit switch or circuit breaker of any suitable type. For instance, there may be used a limit switch or circuit breaker of the type shown in the Industrial Control Handbook, issued by the General Electric Company of Schenectady, New York, and illustrated in Figure 25 of page 2 of the edition of May 2, 1927. Of these two limits switches the upper switch is indicated at 54 and the lower switch at 55 and it may be mentioned that the purpose of these switches is to break the circuit through the motor which, as will be presently described, drives the shaft 34 and thus moves the carriers to and fro.

The shaft 34 is coupled by a coupling 56 with a reducing gear, the housing of which is shown at 57 and this gear is connected by a shaft 58 with a motor 59 suitably supported on a bracket 60 on the left hand housing 11. There is also mounted on this bracket 60 a solenoid actuated brake 61. This solenoid brake is of standard construction such as is shown in Instructions GEH-641, issued by the General Electric Company, June, 1927, and need not be further described. Obviously the carriers 22 must have a reciprocatory movement and therefore the motor 59 is a reversible motor and it is controlled by a reversing switch 62 secured on the left hand housing and the details of which are shown in Figures 17 and 18 where it will be seen that the switch is housed in an ordinary casing wherein is mounted a shaft 63 carrying a drum 64 of insulating material and that this drum has a pair of contact rings 65 shown diagrammatically as a single rotary contact in Figure 26. Each of these contact rings has an offset lug 66 and bearing on the circular part of one ring is a spring contact finger 67 while normally resting on the drum 64 is a second contact 68 which is only engaged by the respective lug 66 at a definite point in the revolution of the drum. Similarly, the other ring has the two contacts 69 and 70. These contacts are supported on blocks of insulation 71 mounted in the housing and from them lead the proper wires, the connections of which will best be understood by reference to Figure 26. It is to be observed that the lugs 66 are spaced around the drum 180° so that with each half revolution of the drum the current is reversed. There is also provided on the housing 11 and connected with the motor, the feed wires and reversing switch, and a magnetic switch 72 of standard construction and which is shown diagrammatically in Figure 26. As will be later explained by reason of the arrangement of these parts the carriers 22 are moved from forward or loading position to rear or pressing position directly beneath the buck 14, one carrier moving in one direction as the other moves in the other.

Extending across between each pair of carriers and resting on the carriers between the end plates 28 is a buck consisting of a buck table 73 and a buck body 74 of the ordinary tapered form. This buck is of the usual hollow construction and provided with the vapor or steam inlet holes 75. In the bottom of the buck table is a suitable valve controlled drain opening and this opening is controlled by a valve 76, the construction of which is best seen in Figure 13. This valve has a body or casing 77 having a lower pipe threaded end 78 which is screwed into the opening in the table 73 and is provided with a central opening, this end forming a valve seat. The inlet openings 79 are made in the sides of this valve and through the body extends a bolt 80 on the lower end of which is fixed a valve proper 81 which normally rests on the seat 78, the pin or bolt 80 being surrounded by a spring 82 which holds the valve closed. Now, the arrangement is such that when these bucks are carried under the platen 14 by the movement of the chains and carriers they are just in proper position to be lifted off the carriers and brought into pressing contact with the platen. That is to say, any clothes placed on the bucks will, when the bucks are raised off the carriers, be pressed by the respective buck and platen.

In order to provide means for raising these bucks into pressing contact and for again allowing them to seat properly on the carriers a shaft 83 runs from side to side of the machine and on this shaft is fixed a pair of cams 84. These cams engage rollers 85 mounted between the depending arms of yokes 86 which extend downwardly from channel members 87. Engaging over these channels and other channel members 88 each formed of a pair of angle irons and connecting the angle irons on one side of the device with the angle irons on the other are channels 89 having their flanges turned upwardly. Housed between the channels 87 and 88 are springs 90 which allow for a certain amount of movement of the channels 89 with respect to the yokes. Depending from the ends of each channel member 87 are guides 91 which work over guide ribs 92 formed on the housings 10 and 11, the beds 73 having corresponding slots 93 which also work over these ribs 92 upon the bucks being raised. Under this arrangement revolution of the shaft 83 causes the channels 89 to move upwardly until they engage the proper bed 73 and raise the buck to force the clothes thereon in contact with the plate 14, the springs 90 yielding to accommodate the thickness of the clothes. It is to be noted that the lower ends of the guide members 91 are kept in proper spaced relation by tie rods 94 and spacing tubes 95. On one of the channels 89 is located a pin 96 which, when the respective buck is in proper position, will engage and lift the valve proper 81 off its seat 87, the pin projecting above the channel ribs to effect this as is shown in Figure 13. Adjacent this pin is a drain opening which is connected by a drain pipe 97 with any suitable place of disposal of the drainage from the buck. Thus every time the buck is lifted the interior is drained.

In order to operate this shaft 83 there is fixed on the shaft a gear 98 which meshes with a gear 99 fixed on a shaft 100 which extends outwardly through the side of the housing into a reduction gearing 101. This reduction gearing is typical of the reduction gearing 57 also and consists of a worm wheel 102 driven by a worm 103 having a shaft 104 which is coupled to the shaft 105 of a motor 106 supported on a bracket 107 fixed to the right hand housing, the reduction gearing being supported on bracket 108 also fixed to this housing. This shaft 105 is likewise provided with a solenoid operated brake 109 of the same type as the other brake and a magnetic switch 110 of ordinary type is carried by the housing 10 to assist in the control of this motor and brake as will best be understood by reference to Figure 26.

There is also provided on the forward end of the right hand arm 12 a starting and safety switch enclosed in a housing 111 and having an operating knob or handle 112. The construction of this switch is most clearly seen by reference to Figures 20 to 22 which will presently be described in detail. In order to drive the reversing switch, so that each complete revolution of the cams 84, and consequent raising and lowering of a buck, may take place while the carriers are standing still it is necessary that each revolution of the shaft 83 be accompanied by one half revolution of the reversing switch in order that the motion of the bucks may be reversed with each revolution of the cams. To accomplish this there is provided on the shaft 63, as shown in Figure 19, a gear 113 which is driven by a pinion 114 of one half the size fixed on the left hand end of the shaft 83.

The starting switch having the casing 111 is provided with a pin or plunger 115 which extends down through a suitable opening in the top of the switch and through an opening in a shelf 116. On this plunger is a collar 117 between which and the shelf is a spring 118 which normally holds the plunger raised. Fixed to one side of this plunger is a pin 119 which enters an opening 120 in a block 121 fixed to a contact lever 122 pivoted to an insulating base 123, the block also being of insulating material. Beneath the free end of this contact lever is a bracket 124 through which passes a spring raised contact pin 125. By this means when the lever 122 is depressed by the action of the plunger 115 contact is made between that lever and the spring contact 125. Extending into the lower part of the casing 111 is a rock shaft 126 whereon is mounted an insulating drum 127 having a contact segment 128 thereon. This contact segment is diagrammatically illustrated in Figure 26 by an ordinary contact lever as at 128'. At each side of the drum there is mounted on an insulating block 129 a spring contact finger 130 which, when the rock arm is oscillated, engages the segment 128, one contact, of course, engaging the segment while the other is free therefrom. Fixed on the shaft 126 is also a sleeve 131 from which projects upwardly an arm 132 having a head 133 which lies in the path of the lower end of the plunger 115 when the segment 128 is in neutral position so that the plunger can not be depressed nor can contact be made between the arm 122 and the pin 125 unless contact has previously been made, by the swinging of the rock arm, between one of the fingers 130 and the segment 128. This device is therefore the safety switch of the invention.

Fixed on the back of the right hand housing is a limit switch 134 the construction of which will best be seen by reference to Figure 23. This switch 134 has a base plate whereon is mounted a two armed contact lever 135 one arm of which is normally urged downward by a spring 136 to engage a spring contact pin 137 mounted on an insulating block 138. Extending from the right hand guide bracket 91 is a downward movement trip arm 139 while from the lower end of this bracket extends an upward movement trip arm 140, these arms traveling, of course, with the bracket as the latter is raised and lowered due to the action of the cams. Thus when the buck device has reached the upper limit of its movement contact will be broken between the lever 135 and the pin 137 and the same thing will take place upon the lower limit of movement of the buck lifting device being reached. These arms 139 and 140 have adjustable lever engaging pins 141 so that this vertical movement can be accurately arranged for.

The magnetic switch 72 is provided with a pair of magnets 142 and 143 and the magnet 142 is arranged when energized to attract the two contact levers 144 and 145 to bring them into engagement with contacts 146 and 147. Similarly, the magnet 143 is arranged to attract the contact levers 148 and 149 and bring them into engagement with fixed contacts 150 and 151. Similarly, the magnetic switch 110 is provided with a magnet 152 which is arranged to attract the contact levers 153 and 154 when energized so that they are brought into engagement with fixed contacts 155 and 156, all of the above being best shown in Figure 26. Now, still referring to that figure current is brought into the machine through the line wires 157 and 158 and from one of these wires a branch 159 extends to the magnet 152 and is provided with a branch 160 connected to the contact 154. From this magnet 152 a wire 161 extends to the contact 128'. The contacts 130 are connected in multiple to a wire 162 which is in turn connected to a wire 163 leading from the contact 125 and extending to the contact 137. The contact 122 is connected by a wire 164 with the contact 135 and this wire 164 is connected to line wire 158 by a wire 165. Also a wire 166 connects contact 153 with the wire 165. The contact 155 is connected by a wire 167 with the motor 106 and from the motor a wire 168 leads to the solenoid brake 109, the other terminal of said brake being connected by a wire 169 with the contact 156. These circuits just described are the pressing circuits.

Turning now to the translation circuits it will be seen that the line wire 157 is connected in multiple to the contacts 146 and 150 by wires 170 and 171. Also this line wire is connected to the magnets 142 and 143 by wires 172 and 173. The contacts 147 and 151 are connected in multiple by wires 174 and 175 with the line wire 158. The movable contacts of the limit switches 54 and 55 are connected in multiple to the line wire 158 through a wire 176. The fixed contact 177 of switch 54 is connected by a wire 178 to contact 69 and from contact 70 a wire 179 leads to magnet 143. The fixed contact 180 of limit switch 55 is connected by a wire 181 with contact 67 and from contact 68 a wire 182 leads to magnet 142. The movable contacts 144 and 149 are connected in multiple to one terminal of the solenoid switch 61 by a wire 183, the other terminal of the solenoid switch being connected by a wire 184 with the motor 59. The movable contacts 145 and 148 of the magnetic switch 72 are connected in multiple to the other side of the motor through a wire 185.

The rock shaft 126 extends through the side of the arm 12 and on the inner end of this rock shaft is carried a double arm rock lever 186 which is normally held in vertical position by springs 187, the rock lever and arm 132 being always in the same position. This rock lever is tilted one way or another by contact with suitable pins 188 on the front ends of the right hand carriers 22 and 23 so that whenever one of the carriers is at the forward limit of its movement the rock lever is tilted as the rock shaft is rocked to move the head 133 from beneath the plunger 115 and thus free this plunger for downward movement.

Now referring back to Figure 26 and considering the pressing circuits first the parts are there shown as in the position in which they will be with one of the bucks at its forward position. Since, to reverse a motor, either the field circuit or the armature circuit alone must be reversed, the motors in Figure 26 shown at 59 and 106 are diagrammatically illustrated as arranged for reversal of the armature circuits, the fields of these motors being connected to the line wires 157 and 158. Now, assuming that the other buck is at its bottom position contact under those circumstances will be broken between the contacts 135 and 137 but contact will exist between contact 128' and contact 130. If now the plunger be depressed contact 122 will engage contact 125 and current will flow from the line wire 157 through wire 159, magnet 152, wire 161, contact 128', contact 130, wire 162, wire 163, contact 125, contact 122, wire 164 and wire 165 to line wire 158. This of course will energize the magnet and contacts 153 and 154 will be brought into engagement with contacts 155 and 156. Current will now flow from the line wire 157, through wire 159, branch 160, contact 154, contact 156, wire 169, solenoid brake 109, wire 168, motor 106, wire 167, contact 155, contact 153, wire 166 and wire 165 back to line wire 158. The energization of the solenoid brake frees this brake and the motor starts to operate with the consequence that the stops 139 and 140 start upwardly thus permitting contact 135 to close on contact 137. The operator after maintaining momentary pressure on 115 releases that pressure but nevertheless current will still flow through the magnet along the following path. The current will flow from line wire 157, through wire 159, magnet 152, wire 161, contact 128', wire 162, wire 163, contact 137, contact 135, wire 164 and wire 165 back to line wire 158. Now this, of course, will maintain the motor in operation until one of the stops 139 or 140 engages the contact 135 and breaks the contact at this point. Now the contact has previously, by the operator's release of the member 115, been broken between 122 and 125. Consequently when either the upward or the downward movement of the buck beneath the platen has been completed, operation of the machine will stop so that the operator can leave the buck, on the upward movement, in contact with the platen as long as he may desire and after the clothes have been sufficiently pressed he may again start the foregoing cycle of operations by depressing the plunger 115. Now as the motor 106 drives the gear 114 the contact 65 will be rotated by the upward movement one quarter of a turn so as to leave it out of contact with both the contacts 69 and 70 and 67 and 68. However, at the completion of the downward movement the contact 65 bridges two of these contacts and in the present instance it has been shown as bridging the contacts 69 and 70. Now, under these circumstances current will flow from the line wire 157 through wire 171, wire 173, magnet 143, wire 179, contact 70, contact 65, contact 69, wire 178, switch 54, wire 176 back to line wire 158. Now this, of course, energizes magnet 143 and contacts 148 and 149 are brought into engagement with contacts 150 and 151 so that current flows from the wire 157, through wire 171, contact 150, contact 148, wire 185, motor 59, wire 184, solenoid brake 61, wire 183, contact 149, contact 151 to line wire 158. Now this operates the motor 59 until the magnet switch 54 is opened by movement of translation of the upper buck into position beneath the platen whereupon contact is broken through the magnet 143 and the contacts 148 and 149 open from 150 and 151, and current is cut off the motor and the solenoid brake is set by its springs. Now the upper buck is in position for lifting by the action of the motor 106 and when this buck has been lifted and raised the contact 65 will have swung into engagement with the contacts 67 and 68 so that current will now be reversed through the motor 59, as can readily be traced, by the magnet 142 closing contacts 144 and 145 on 146 and 147. Thus every time the buck beneath the platen completes a movement of lifting from and replacement on the carrier this automatically effects closing of one or the other translation circuits through the motor 59 and causes translatory movement of the bucks.

It will be further noted that the bucks in this device can be removed and other bucks substituted since all that it is necessary to do, when the bucks and carriages are in their forward position, is to lift one buck and its supporting plate or base off the carriage and put another buck in position, it being understood that the same base is used for all sizes of bucks.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an ironing machine, a frame, a platen fixed on said frame, a plurality of bucks supported on said frame and movable successively to cooperating position relative to said platen and in spaced relation thereto, electrically driven means for moving the bucks into said cooperative position, other electrical driving means for moving the positioned buck toward and from the platen, and switch means controlled by the movements of the bucks for automatically cutting out the first electrical means and cutting in the second electrical means upon the respective buck assuming said cooperative position.

2. In an ironing machine, a frame, a platen fixed on said frame, a plurality of bucks supported on said frame and movable successively to cooperating position relative to said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, and a manually operable starting switch for starting operation of the first electrically driven means.

3. In an ironing machine, a frame, a platen fixed on said frame, a plurality of bucks supported on said frame and movable successively to cooperating position relative to said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, and a reversing switch for reversing the movement of the second electrical driving means at the limits of its movements toward and from said platen.

4. In an ironing machine, a frame, a platen fixed on said frame, a plurality of bucks supported on said frame and movable successively to cooperating position relative to said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, a reversing switch for reversing the movement of the second electrical driving means at the limits of its movements toward and from said platen, and a manually operable starting switch for starting operation of the first electrically driven means.

5. In an ironing machine, a frame, a platen fixed on said frame, a plurality of bucks supported on said frame and movable successively to cooperating position relative to said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, a manually operable starting switch for starting operation of the first electrically driven means, and a safety device operated by the movement of said bucks and arranged to prevent operation of the starting switch during movement of the bucks into and out of cooperating relation with the platen.

6. In an ironing machine, a frame, a platen fixed on said frame, a plurality of bucks supported on said frame and movable successively to cooperating position relative to said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, a manually operable starting switch for starting operation of the first electrically driven means, a safety device operated by the movement of said bucks and arranged to prevent operation of the starting switch during movement of the bucks into and out of cooperating relation with the platen, and a reversing switch for reversing the movement of the second electrical driving means at the limits of its movements toward and from said platen.

7. In an ironing machine, a frame, a platen fixed on said frame and having its operating face downward, a pair of bucks mounted on said frame to move horizontally into and out of operative position beneath said platen and in spaced relation thereto, electrically driven means for moving the bucks into said cooperative position, other electrical driving means for moving the positioned buck toward and from the platen, and switch means controlled by the movements of the bucks for automatically cutting out the first electrical means and cutting in the second electrical means upon the respective buck assuming said cooperative position.

8. In an ironing machine, a frame, a platen fixed on said frame and having its operating face downward, a pair of bucks mounted on said frame to move horizontally into and out of operative position beneath said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, and a manually operable starting switch for starting operation of the first electrically driven means.

9. In an ironing machine, a frame, a platen fixed on said frame and having its operating face downward, a pair of bucks mounted on said frame to move horizontally into and out of operative position beneath said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, and a reversing switch for reversing the movement of the second electrical driving means at the limits of its movements toward and from said platen.

10. In an ironing machine, a frame, a platen fixed on said frame and having its operating face downward, a pair of bucks mounted on said frame to move horizontally into and out of operative position beneath said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, a reversing switch for reversing the movement of the second electrical driving means at the limits of its movements toward and from said platen, and a manually operable starting switch for starting operation of the first electrically driven means.

11. In an ironing machine, a frame, a platen fixed on said frame and having its operating face downward, a pair of bucks mounted on said frame to move horizontally into and out of operative position beneath said platen and in spaced relation thereto, electrically driven means for moving the bucks into said cooperative position, other electrical driving means for moving the positioned buck toward and from the platen switch means controlled by the movements of the bucks for automatically cutting out the first electrical means and cutting in the second electrical means upon the respective buck assuming said cooperative position, a manually operable starting switch for starting operation of the first electrically driven means, and a safety device operated by the movement of said bucks and arranged to prevent operation of the starting switch during movement of the bucks into and out of cooperating relation with the platen.

12. In an ironing machine, a frame, a platen fixed on said frame and having its operating face downward, a pair of bucks mounted on said frame to move horizontally into and out of operative position beneath said platen and in spaced relation thereto, electrically driven means for moving the bucks into said cooperative position, other electrical driving means for moving the positioned buck toward and from the platen, switch means controlled by the movements of the bucks for automatically cutting out the first electrical means and cutting in the second electrical means upon the respective buck assuming said cooperative position, a manually operable starting switch for starting operation of the first electrically driven means, a safety device operated by the movement of said bucks and arranged to prevent operation of the starting switch during movement of the bucks into and out of cooperating relation with the platen, and a reversing switch for reversing the movement of the second electrical driving means at the limits of its movements toward and from said platen.

13. In an ironing machine, a frame, a platen fixed on said frame and having its operating face downwards, upper and lower trackways leading from the front of the machine beneath said platen, buck carriers movable along said trackways, means connecting said carriers to move one carrier forward from beneath the platen as the other moves inwardly to operative position beneath the platen, bucks each supported on the carriers of a respective trackway and movable vertically with respect thereto, and lifting means to move the buck beneath the platen into and out of contact with said platen.

14. In an ironing machine, a frame, a platen fixed on said frame and having its operating face downwards, upper and lower trackways leading from the front of the machine beneath said platen, buck carriers movable along said trackways, means connecting said carriers to move one carrier forward from beneath the platen as the other moves inwardly to operative position beneath the platen, bucks each supported on the carriers of a respective trackway and movable vertically with respect thereto, lifting means to move the buck beneath the platen into and out of contact with said platen, electrically driven means for moving the carriers along the trackways, other electrical driving means for raising and lowering the buck in position beneath the platen, and switch means controlled by the action of the first electrical driving means for effecting cutting out of the first electrical means and cutting in the second electrical means.

15. In an ironing machine, a frame, a platen fixed on said frame and having its operating face downwards, upper and lower trackways leading from the front of the machine beneath said platen, buck carriers movable along said trackways, means connecting said carriers to move one carrier forward from beneath the platen as the other moves inwardly to operative position beneath the platen, bucks each supported on the carriers of a respective trackway and movable vertically with respect thereto, lifting means to move the buck beneath the platen into and out of contact with said platen, electrically driven means for moving the carriers along the trackways, other electrical driving means for raising and lowering the buck in position beneath the platen, switch means controlled by the action of the first electrical driving means for effecting cutting out of the first electrical means and cutting in the second electrical means, and a manually operable starting switch for starting operation of the first electrically driven means.

16. In an ironing machine, a frame, a platen fixed on said frame and having its operating face downwards, upper and lower trackways leading from the front of the machine beneath said platen, buck carriers movable along said trackways, means connecting said carriers to move one carrier forward from beneath the platen as the other moves inwardly to operative position beneath the platen, bucks each supported on the carriers of a respective trackway and movable vertically with respect thereto, lifting means to move the buck beneath the platen into and out of contact with said platen, electrically driven means for moving the carriers along the trackways, other electrical driving means for raising and lowering the buck in position beneath the platen, switch means controlled by the action of the first electrical driving means for effecting cutting out of the first electrical means and cutting in the second electrical means, and a reversing switch for reversing the movement of the second electrical driving means at the limits of its movements toward and from said platen.

17. In an ironing machine, a frame, a platen fixed on said frame and having its operating face downwards, upper and lower trackways leading from the front of the machine beneath said platen, buck carriers movable along said trackways, means connecting said carriers to move one carrier forward from beneath the platen as the other moves inwardly to operative position beneath the platen, bucks each supported on the carriers of a respective trackway and movable vertically with respect thereto, lifting means to move the buck beneath the platen into and out of contact with said platen, electrically driven means for moving the carriers along the trackways, other electrical driving means for raising and lowering the buck in position beneath the platen, switch means controlled by the action of the first electrical driving means for effecting cutting out of the first electrical means and cutting in the second electrical means, a reversing switch for reversing the movement of the second electrical driving means at the limits of its movements toward and from said platen, and a manually operable starting switch for starting operation of the first electrically driven means.

18. In an ironing machine, a frame, a platen fixed on said frame and having its operating face downwards, upper and lower trackways leading from the front of the machine beneath said platen, buck carriers movable along said trackways, means connecting said carriers to move one carried forward from beneath the platen as the other moves inwardly to operative position beneath the platen, bucks each supported on the carriers of a respective trackway and movable vertically with respect thereto, lifting means to move the buck beneath the platen into and out of contact with said platen, electrically driven means for moving the carriers along the trackways, other electrical driving means for raising and lowering the buck in position beneath the platen, switch means controlled by the action of the first electrical driving means for effecting cutting out of the first electrical means and cutting in the second electrical means, a reversing switch for reversing the movement of the second electrical driving means at the limits of its movements toward and from said platen, and a safety device operated by the movement of said bucks and arranged to prevent operation of the starting switch during movement of the bucks into and out of cooperating relation with the platen.

19. In an ironing machine, a pair of spaced side frames, a platen fixed on the upper ends of said frames and having its working side downwardly disposed, a pair of arms projecting forwardly from said frames, upper tracks extending along said arms and across said frames, lower tracks similarly arranged on said arms and frames, sprockets at the front of said arms and rear of said frames, endless chains connecting said sprockets having upper and lower runs extending adjacent said tracks, carrier frames each running on a respective track and connected to said chain runs whereby the carriers on the upper and lower tracks run in opposite directions, bucks supported on said carriers to span the space between said frames and arms, and means between the lower part of said frames to lift the bucks off the carriers and bring them into contact with said platen.

20. In an ironing machine, a pair of spaced side frames, a platen fixed on the upper ends of said frames and having its working side downwardly disposed, a pair of arms projecting forwardly from said frames, upper tracks extending along said arms and across said frames, lower tracks similarly arranged on said arms and frames, sprockets at the front of said arms and rear of said frames, endless chains connecting said sprockets having upper and lower runs extending adjacent said tracks, carrier frames each running on a respective track and connected to said chain runs whereby the carriers on the upper and lower tracks run in opposite directions, bucks supported on said carriers to span the space between said frames and arms, means between the lower part of said frames to lift the bucks off the carriers and bring them into contact with said platen, electric driving means for said sprockets, other electric driving means for the lifting means, and switch means controlled by the movements of the carriers and lifting means for controlling the operation of the electric driving means.

21. In an ironing machine, a platen, a buck arranged to move laterally into and out of operative position relative to the platen and further arranged for pressing movement toward and from the platen, a motor for effecting pressing movement, a circuit through said motor, a magnetic relay for closing said circuit, a starting switch for closing a circuit through the magnet of said relay, other motor means for effecting lateral movement of said buck and switch means for starting the first motor and stopping the last motor means operable upon movement of the last motor means to a predetermined position.

22. In an ironig machine, a platen, a buck arranged to move laterally into and out of operative position relative to the platen and further arranged for pressing movement toward and from the platen, a motor for effecting pressing movement, a circuit through said motor, a magnetic relay for closing said circuit, a starting switch for closing a circuit through the magnet of said relay, a safety device arranged to lock the starting switch from closing during the lateral movement of the buck, said safety device being controlled by said lateral movement, and other motor means for effecting lateral movement of said buck.

23. In an ironing machine, a platen, a buck arranged to move laterally into and out of operative position relative to the platen and further arranged for pressing movement toward and from the platen, a motor for effecting pressing movement, a circuit through said motor, a magnetic relay for closing said circuit, a starting switch for closing a circuit through the magnet of said relay, a safety device arranged to lock the starting switch from closing during the lateral movement of the buck, said safety device being controlled by said lateral movement, a second circuit through the magnet of the relay closed during pressing movement of the buck and opened at each end of said movement and including a circuit breaker opened by movement of the buck at each end thereof, and other motor means for effecting lateral movement of said buck.

24. In an ironing machine, a platen, a buck arranged to move laterally into and out of operative positon relative to the platen and further arranged for pressing movement toward and from the platen, a motor for effecting pressing movement, a circuit through said motor, a magnetic relay for closing said circuit, a starting switch for closing a circuit through the magnet of said relay, a second motor for moving the buck laterally, and means controlled by movement of the first motor for closing a circuit through the second motor and operable only upon cessation of pressing movement of the buck.

25. In an ironing machine, a platen, a buck arranged to move laterally into and out of operative position relative to the platen and further arranged for pressing movement toward and from the platen, a motor for effecting pressing movement, a circuit through said motor, a magnetic relay for closing said circuit, a starting switch for closing a circuit through the magnet of said relay, a second motor for moving the buck laterally, the second motor being a reversible motor, and means controlled by movement of the first motor for closing a circuit first in one direction and then in the other direction through said second motor.

26. In an ironing machine, a platen, a buck arranged to move laterally into and out of operative position relative to the platen and further arranged for pressing movement toward and from the platen, a motor for effecting pressing movement, a circuit through said motor, a magnetic relay for closing said circuit, a starting switch for closing a circuit through the magnet of said relay, a second motor for moving the buck laterally, the second motor being a reversible motor, a reversing switch operatively geared to the first motor, a pair of relay magnets in circuit with the reversing switch and alternately energized by movement thereof, and relay circuits leading through the second motor in opposite directions and each controlled by a respective magnet.

27. In an ironing machine, a platen, a buck arranged to move laterally into and out of operative positive relative to the platen and further arranged for pressing movement toward and from the platen, a motor for effecting pressing movement, a circuit through said motor, a magnetic relay for closing said circuit, a starting switch for closing a circuit through the magnet of said relay, a second motor for moving the buck laterally, the second motor being a reversible motor, a reversing switch operatively geared to the first motor, a pair of relay magnets in circuit with the reversing switch and alternately energized by movement thereof, relay circuits leading through the second motor in opposite directions and each controlled by a respective magnet, and circuit breakers each in a magnet circuit and operated to open said magnet circuits selectively upon completion of forward and backward movements of the buck respectively.

28. In an ironing machine, a platen, a buck arranged to move laterally into and out of operative position relative to the platen and further arranged for pressing movement toward and from the platen, a motor for effecting pressing movement, a circuit through said motor, a magnetic relay for closing said circuit, a starting switch for closing a circuit through the magnet of said relay, a second motor for moving the buck laterally, the second motor being a reversible motor, means controlled by movement of the first motor for closing a circuit first in one direction and then in the other direction through said second motor, and electric brakes for said motors each in the respective motor circuit and releasing the motor for rotation upon energization thereof.

29. In a machine of the class described, a pair of spaced trackways, pairs of spaced carriers each pair moving on a respective trackway between operative and loading positions, the said carriers in loading position being freely accessible from above, and a buck having a base spanning the space between the carriers and resting removably thereon, said buck being freely movable in a vertical direction upon the carriers being moved to loading position.

30. In a machine of the class described, a pair of spaced track ways, pairs of spaced carriers, each pair moving on a respective track way, bucks each resting removably on a respective pair of carriers, a platen above a point in the paths of said bucks, said bucks being movable with the carriers in alternation into and out of operative position beneath said platen, lifting means engageable with the bucks in operative positions of the latter to lift the respective buck off its carriers into pressing relation with the platen and withdrawing the buck from the platen, an actuating mechanism for moving the bucks into and out of position beneath the platen, a control device for said actuating means, and a second control device arranged to stop operation of the actuating mechanism and start operation of the lifting means upon a buck reaching operative position beneath the platen.

31. In a machine of the class described, a pair of spaced track ways, pairs of spaced carriers, each pair moving on a respective track way, bucks each resting removably on a respective pair of carriers, a platen above a point in the paths of said bucks, said bucks being movable with the carriers in alternation into and out of operative position beneath said platen, lifting means engageable with the bucks in operative positions of the latter to lift the respective buck off its carriers into pressing relation with the platen and withdrawing the buck from the platen, an actuating mechanism for moving the bucks into and out of position beneath the platen, a control device for said actuating means, a second control device arranged to stop operation of the actuating mechanism and start operation of the lifting means upon a buck reaching operative position beneath the platen, and a safety device arranged to prevent operation of the second control device during operation of the actuating mechanism, said safety device being controlled by the position of the carriers on said trackways.

32. In a machine of the class described, a pair of spaced track ways, pairs of spaced carriers, each pair moving on a respective track way, bucks each resting removably on a respective pair of carriers, a platen above a point in the paths of said bucks, said bucks being movable with the carriers in alternation into and out of operative position beneath said platen, lifting means engageable with the bucks in operative positions of the latter to lift the respective buck off its carriers into pressing relation with the platen and withdrawing the buck from the platen, an actuating mechanism for moving the bucks into and out of position beneath the platen, a control device for said actuating means, a second control device arranged to stop operation of the actuating mechanism and start operation of the lifting means upon a buck reaching operative position beneath the platen, a safety device arranged to prevent operation of the second control device during operation of the actuating mechanism, said safety device being controlled by the position of the carriers on said trackways, and means actuated by completion of the withdrawal of a buck from the platen for effecting operation of the actuating means to move the buck from beneath the platen.

33. In a machine of the class described, spaced carriers, means for supporting said carriers and guiding them to move in fixed paths, bucks each resting removably on a respective carrier, a platen above a point in the paths of said bucks, said bucks being movable with the carriers in alternation into and out of operative position beneath said platen, lifting means engageable with the bucks in operative positions of the latter to lift the respective buck off its carriers into pressing relation with the platen and withdrawing the buck from the platen, an actuating mechanism for moving the bucks into and out of position beneath the platen, a control device for said actuating means, and a second control device arranged to stop operation of the actuating mechanism and start operation of the lifting means upon a buck reaching operative position beneath the platen.

In testimony whereof I affix my signature.

CECIL H. BOYULS.